United States Patent
Igarashi

(10) Patent No.: US 9,778,714 B2
(45) Date of Patent: Oct. 3, 2017

(54) INFORMATION PROCESSING APPARATUS, NON-TRANSITORY COMPUTER-READABLE MEDIUM, AND POWER MANAGEMENT METHOD

(71) Applicant: Masaaki Igarashi, Tokyo (JP)

(72) Inventor: Masaaki Igarashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 321 days.

(21) Appl. No.: 14/297,730

(22) Filed: Jun. 6, 2014

(65) Prior Publication Data
US 2014/0365802 A1 Dec. 11, 2014

(30) Foreign Application Priority Data

Jun. 11, 2013 (JP) .................................. 2013-123224

(51) Int. Cl.
G06F 1/00 (2006.01)
G06F 1/26 (2006.01)
G06F 1/32 (2006.01)

(52) U.S. Cl.
CPC ............ *G06F 1/266* (2013.01); *G06F 1/3203* (2013.01); *G06F 1/3215* (2013.01); *G06F 1/3287* (2013.01)

(58) Field of Classification Search
CPC ...... G06F 1/266; G06F 1/3215; G06F 1/3203; G06F 1/3287
See application file for complete search history.

(56) References Cited

U.S. PATENT DOCUMENTS

| 2006/0282594 | A1* | 12/2006 | Motoe | G06F 13/409 710/301 |
| 2007/0155349 | A1* | 7/2007 | Nelson | H02J 13/0013 455/128 |
| 2009/0077400 | A1* | 3/2009 | Enami | G06F 1/266 713/320 |

(Continued)

FOREIGN PATENT DOCUMENTS

| JP | H05119875 A | 5/1993 |
| JP | H0984146 A | 3/1997 |

(Continued)

*Primary Examiner* — Mohammed Rehman
*Assistant Examiner* — Gayathri Sampath
(74) *Attorney, Agent, or Firm* — Harness, Dickey & Pierce, PLC

(57) ABSTRACT

An information processing apparatus includes: a communication unit that performs communication with a power supply controller controlling supply and shutoff of power supply of a device; an operation receiving unit that receives input of user operation; an instructing unit that instructs the power supply controller via the communication unit to supply or shut off power supply in response to user operation concerning supply or shutoff of power supply of the device; a setting unit that sets power supply specified to be not permitted to shut off in response to user operation to specify the power supply to be not permitted to shut off; and an instruction disabling unit that disables an instruction to shut off power supply by the instructing unit when the power supply set to be not permitted to shut off is a target of the instruction to shut off power supply by the instructing unit.

14 Claims, 14 Drawing Sheets

(56) References Cited

U.S. PATENT DOCUMENTS

| | | | | |
|---|---|---|---|---|
| 2009/0179490 A1* | 7/2009 | Nagao | ............... | G06F 1/266 |
| | | | | 307/31 |
| 2011/0107128 A1* | 5/2011 | Otani | ............... | G06F 3/122 |
| | | | | 713/321 |
| 2013/0049466 A1* | 2/2013 | Adams | ............... | G06F 1/266 |
| | | | | 307/39 |
| 2013/0179700 A1* | 7/2013 | Toda | ............... | G06F 1/26 |
| | | | | 713/300 |
| 2013/0338844 A1* | 12/2013 | Chan | ............... | H01R 13/6683 |
| | | | | 700/295 |

FOREIGN PATENT DOCUMENTS

| | | | |
|---|---|---|---|
| JP | 2007-159298 A | 6/2007 | |
| JP | 2007-295433 A | 11/2007 | |
| JP | 2010-19881 A | 9/2010 | |
| JP | 2011-072099 A | 4/2011 | |
| JP | 2011-159236 A | 8/2011 | |
| JP | 2012055124 A | 3/2012 | |
| JP | 2012-226562 A | 11/2012 | |
| JP | 6094227 B2 | 3/2017 | |

* cited by examiner

FIG.5

| UPDATE | POWER STRIP #1 | POWER STRIP #2 | POWER STRIP #3 | POWER STRIP #4 |
|---|---|---|---|---|
| OUTLET #1 | 100 W | 20 W | 300 W | 0 W |
| OUTLET #2 | 50 W | 300 W | 100 W | 500 W |
| OUTLET #3 | 0 W | 0 W | 0 W | 0 W |
| OUTLET #4 | 300 W | 100 W | 100 W | 500 W |
| OUTLET #5 | 0 W | 0 W | 100 W | 50 W |

FIG.6

| UPDATE | POWER STRIP #1 | POWER STRIP #2 | POWER STRIP #3 | POWER STRIP #4 |
|---|---|---|---|---|
| OUTLET #1 | ON | ON | ON | OFF |
| OUTLET #2 | ON | ON | ON | ON |
| OUTLET #3 | OFF | OFF | OFF | OFF |
| OUTLET #4 | ON | ON | ON | ON |
| OUTLET #5 | OFF | OFF | ON | ON |

FIG.7

| UPDATE | POWER STRIP #1 | POWER STRIP #2 | POWER STRIP #3 | POWER STRIP #4 |
|---|---|---|---|---|
| OUTLET #1 | ~~ON~~ | ON | ~~ON~~ | OFF |
| OUTLET #2 | ON | ON | ON | ON |
| OUTLET #3 | OFF | OFF | OFF | OFF |
| OUTLET #4 | ~~ON~~ | ~~ON~~ | ~~ON~~ | ~~ON~~ |
| OUTLET #5 | OFF | OFF | ON | ON |

INFORMATION PROCESSING APPARATUS, NON-TRANSITORY COMPUTER-READABLE MEDIUM, AND POWER MANAGEMENT METHOD

CROSS-REFERENCE TO RELATED APPLICATIONS

The present application claims priority to and incorporates by reference the entire contents of Japanese Patent Application No. 2013-123224 filed in Japan on Jun. 11, 2013.

BACKGROUND OF THE INVENTION

1. Field of the Invention

The present invention relates to an information processing apparatus, a non-transitory computer-readable medium, and a power management method.

2. Description of the Related Art

Technologies to manage electrical power of various devices have been known. For example, Japanese Patent Application Laid-open No. H09-084146 discloses a technology in which a warning message is output and the power supply of a device is shut off when an upper limit of power consumption predetermined is reached, so as to prevent the power supply for all of the devices from being shut off by a circuit breaker tripping off.

The above-described conventional technology may, however, shut off the power supply of a device that is undesirable to cut the supply of power.

Therefore, it is desirable to provide an information processing apparatus, a non-transitory computer-readable medium, and a power management method that are capable of preventing erroneously shutting off the power supply of a device that is undesirable to cut the supply of power.

SUMMARY OF THE INVENTION

It is an object of the present invention to at least partially solve the problems in the conventional technology.

According to an aspect of the present invention, there is provided an information processing apparatus including: a communication unit that performs communication with a power supply controller controlling supply and shutoff of power supply of a device; an operation receiving unit that receives input of user operation; an instructing unit that instructs the power supply controller via the communication unit to supply or shut off power supply in response to user operation concerning supply or shutoff of power supply of the device; a setting unit that sets power supply specified to be not permitted to shut off in response to user operation to specify the power supply to be not permitted to shut off; and an instruction disabling unit that disables an instruction to shut off power supply by the instructing unit when the power supply set to be not permitted to shut off is a target of the instruction to shut off power supply by the instructing unit.

According to another aspect of the present invention, there is provided a non-transitory computer-readable medium including computer readable program codes, performed by a processor, the program codes when executed causing the processor to execute: instructing a power supply controller that controls supply and shutoff of power supply of a device to supply or shut off power supply in response to user operation concerning supply or shutoff of power supply of the device; setting power supply specified to be not permitted to shut off in response to user operation to specify the power supply to be not permitted to shut off; and disabling an instruction to shut off power supply at the instructing when the power supply specified to be not permitted to shut off is a target of the instruction to shut off at the instructing.

According to still another aspect of the present invention, there is provided a power management method performed by an information processing apparatus, the method including: instructing a power supply controller that controls supply and shutoff of power supply of a device to supply or shut off power supply in response to user operation concerning supply or shutoff of power supply of the device; setting power supply specified to be not permitted to shut off in response to user operation to specify the power supply to be not permitted to shut off; and disabling an instruction to shut off power supply at the instructing when the power supply specified to be not permitted to shut off is a target of the instruction to shut off at the instructing The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a display screen for an instant power consumption status;

FIG. 6 is a diagram illustrating an example of a display screen to specify power supply to be supplied or shut off;

FIG. 7 is a diagram illustrating an example of a display screen to set the power supply to be not permitted to shut off;

DETAILED DESCRIPTION OF THE PREFERRED EMBODIMENTS

With reference to the accompanying drawings, the following describes exemplary embodiments of an information processing apparatus, a power management method, and a power management system according to the present invention. The invention, however, is not intended to be restricted by the following embodiments. Each of the embodiments can be combined appropriately within a range not making the content inconsistent. While an image processing apparatus such as a multifunction peripheral (MFP) is illustrated and described to be used as the information processing apparatus in the invention in the following description, it is not limited to this. The MFP in the invention means a device that has at least two or more functions out of printer function, copying function, scanner function, and facsimile function.

First Embodiment

Hardware Configuration

Figure 1:
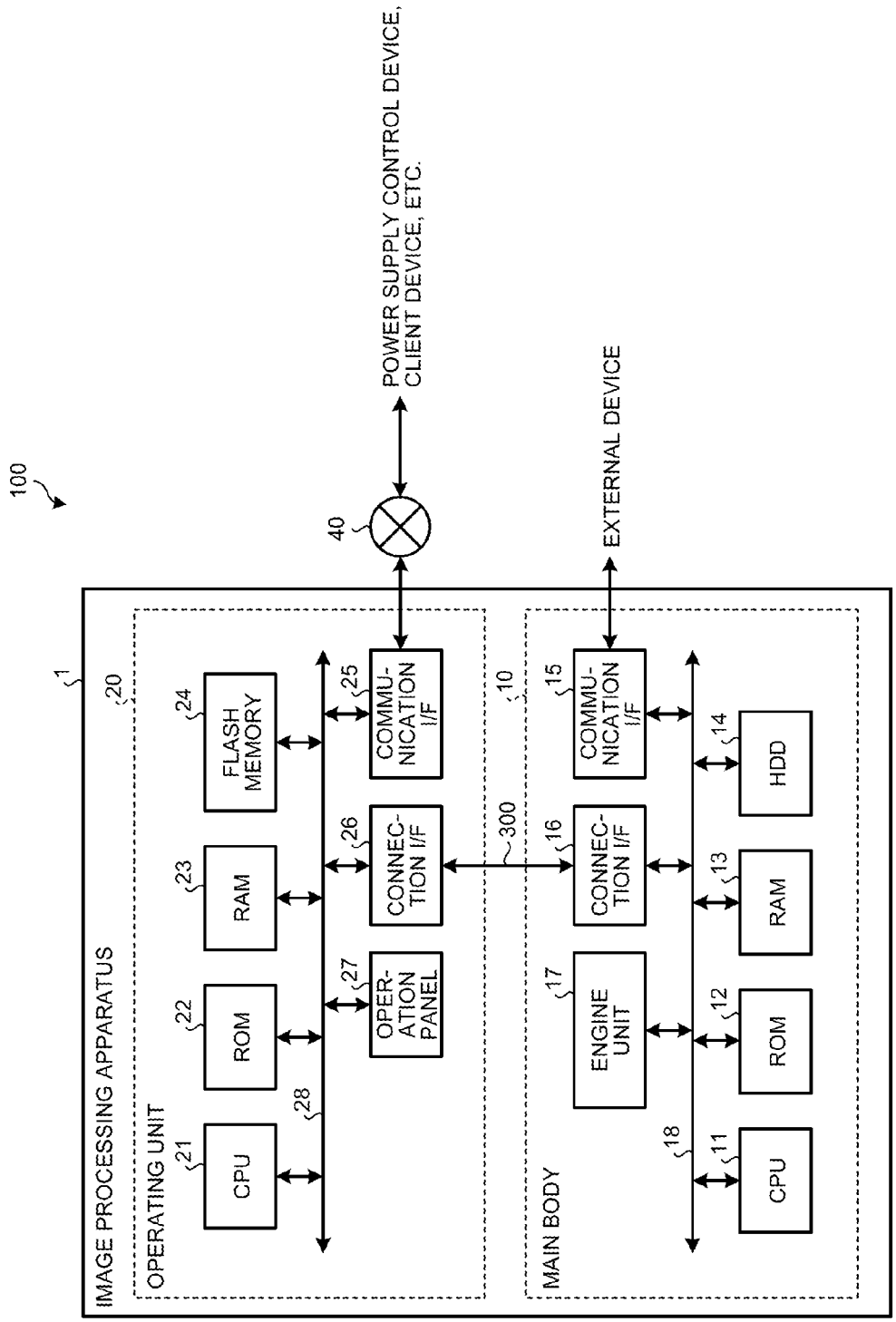
FIG. 1 is a block diagram illustrating an example of the hardware configuration of a power management system.

With reference to FIG. 1, the hardware configuration of a power management system will be described. FIG. 1 is a block diagram illustrating an example of the hardware configuration of the power management system.

As illustrated in FIG. 1, a power management system 100 includes an image processing apparatus 1 and a power supply control device. The image processing apparatus 1 is connected to the power supply control device, a client device, and others via a network 40 such as a local area network (LAN) and the Internet.

The image processing apparatus 1 includes a main body 10 that is capable of implementing various functions such as printer function, copying function, scanner function, and facsimile function, and an operating unit 20 that receives input in response to user operation. The main body 10 and the operating unit 20 are communicatively connected via a dedicated communication path 300. While the communication path 300 can use the universal serial bus (USE) specification, for example, it may use any specification regardless of being wired or wireless.

The main body 10 operates in response to input received by the operating unit 20. Furthermore, the main body 10 is capable of communicating with any external device, and can operate in response to instructions received from the external device.

The main body 10 further includes a CPU 11, a ROM 12, a RAM 13, a hard disk drive (HDD) 14, a communication interface (I/F) 15, a connection I/F 16, and an engine unit 17 being all connected to a system bus 18.

The CPU 11 controls overall operation of the main body 10. The CPU 11 executes programs stored in the ROM 12 or the HDD 14 with the RAM 13 as a work area so as to control the operation of the whole main body 10. The CPU 11 further implements the above-described various functions such as printer function, copying function, scanner function, and facsimile function.

The communication I/F 15 is an interface to perform communication with the external device. The connection I/F 16 is an interface to perform communication with the operating unit 20 via the communication path 300.

The engine unit 17 is the hardware that performs the processes, other than the processes of general information processing and communication, to implement printer function, copying function, scanner function, and facsimile function, for example. The engine unit 17 includes a scanner that scans and reads documents, a plotter that performs printing on sheet material such as paper, and a facsimile unit that performs facsimile communication, for example. The engine unit 17 can further include specific options such as a finisher that sorts printed sheet material, and an automatic document feeder (ADF) that automatically feeds documents.

The operating unit 20 includes a CPU 21, a ROM 22, a RAM 23, a flash memory 24, a communication I/F 25, a connection I/F 26, and an operation panel 27 being all connected to a system bus 28.

The CPU 21 controls overall operation of the operating unit 20. The CPU 21 executes programs stored in the ROM 22 or the flash memory 24 with the RAM 23 as a work area so as to control the operation of the whole operating unit 20. The CPU 21 implements various functions such as displaying information (images) in response to input received by user operation.

The communication I/F 25 is an interface to perform communication with the power supply control device and the client device via the network 40. The connection I/F 26 is an interface to perform communication with the main body 10 via the communication path 300.

The operation panel 27 receives a variety of input in response to user operation and displays various types of information. The various types of information includes the information in response to the input received, the information representing an operating status of the image processing apparatus 1, and the information representing a set state, for example. While the operation panel 27 is assumed to be composed of a liquid crystal display (LCD) device provided with a touch panel function in the first embodiment, it is not limited to this. For example, the operation panel 27 may be composed of an organic electroluminescence (EL) display device provided with a touch panel function. Furthermore, in addition to or in place of the operation panel 27, an operating unit such as hardware keys and a display unit such as lamps can be provided.

Software Configuration

Figure 2:
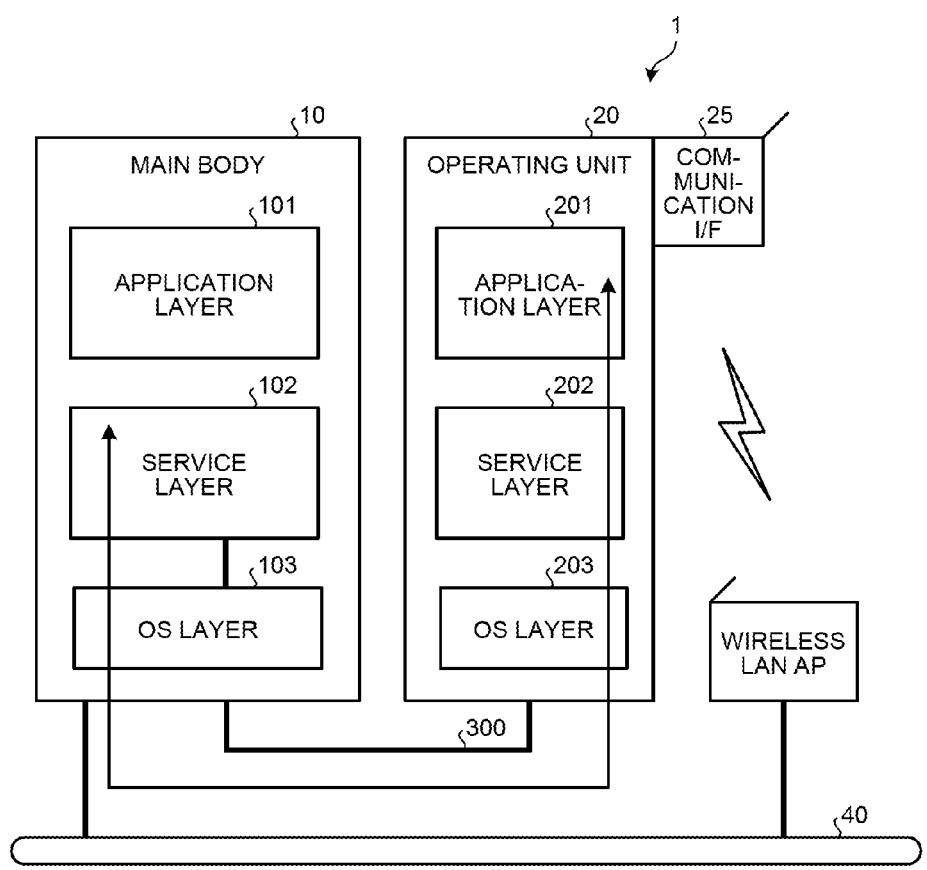
FIG. 2 is a block diagram schematically illustrating an example of the software configuration of an image processing apparatus.

Next, with reference to FIG. 2, the software configuration of the image processing apparatus 1 will be described. FIG. 2 is a block diagram schematically illustrating an example of the software configuration of the image processing apparatus 1.

As illustrated in FIG. 2, the main body 10 includes an application layer 101, a service layer 102, and an operating system (OS) layer 103. The entities of the application layer 101, the service layer 102, and the OS layer 103 are a variety of software stored in the ROM 12 and the HDD 14, for example. The CPU 11 executing such software provides the various functions.

The software in the application layer 101 is application software (hereinafter, may be referred to as an application) that causes hardware resources to operate to provide a given function. The applications include a copying application to provide copying function, a scanner application to provide scanner function, a facsimile application to provide facsimile function, and a printer application to provide printer function, for example.

The software in the service layer 102 is the software that intervenes between the main body 10 and the OS layer 103, and provides an interface to use the hardware resources of the main body 10. More specifically, such software is the software to provide functions of receiving operation requests for the hardware resources and performing arbitration of the operation requests. The operation requests received by the service layer 102 include a request to read by the scanner and a request to print by the plotter.

The interface function by the service layer 102 is provided not only to the application layer 101 of the main body 10 but also to an application layer 201 of the operating unit 20. In other words, the application layer 201 of the operating unit 20 can implement the functions that use the hardware resources (for example, the engine unit 17) of the main body 10 via the interface function of the service layer 102.

The software in the OS layer 103 is basic software (an operating system) to provide basic functions to control the hardware of the main body 10. The software in the service layer 102 converts requests from the various applications to use the hardware resources into commands that the OS layer 103 can interpret, and delivers the commands to the OS layer 103. The software in the OS layer 103 executing the commands then causes the hardware resources to operate in accordance with the requests of the applications.

The operating unit 20 includes the application layer 201, a service layer 202, and an OS layer 203. The hierarchical structure of the application layer 201, the service layer 202, and the OS layer 203 of the operating unit 20 is the same as that of the main body 10. However, the functions provided by the applications in the application layer 201 and the types of operation requests that the service layer 202 can receive are different from those on the main body 10. The application in the application layer 201 is the software that operates the hardware resources of the operating unit 20 to provide given functions. In addition, the application in the application layer 201 is the software that provides the function of user interface (UI) to perform operations and to provide displays concerning the functions of the main body 10 (printer function, copying function, scanner function, and facsimile function).

In the first embodiment, to keep the independence of functions, the software in the OS layer 103 of the main body 10 and the software in the OS layer 203 of the operating unit 20 are exemplified to be different from each other. That is, the main body 10 and the operating unit 20 operate independent of each other by the different operating systems. For example, it is possible to employ Linux (registered trademark) as the software in the OS layer 103 of the main body 10 and to employ Android (registered trademark) as the software in the OS layer 203 of the operating unit 20.

As in the foregoing, in the image processing apparatus 1 in the first embodiment, because the main body 10 and the operating unit 20 operate on the different operating systems, the communication between the main body 10 and the operating unit 20 is performed not as an interprocess communication within a common device but as a communication between different devices. For example, the operation (command communication) of delivering the input (content of an instruction by user operation) received by the operating unit 20 to the main body 10 and the operation of the main body 10 to notify the operating unit 20 of events are performed as the communication between different devices. Consequently, the operating unit 20 performing communication with the main body 10 enables the operating unit 20 to use the functions of the main body 10. The events of which the operating unit 20 is notified by the main body 10 include an execution status of the operation in the main body 10 and the content set on the main body 10.

Furthermore, in the first embodiment, the supply of power to the operating unit 20 is provided from the main body 10 via the communication path 300. Consequently, the power supply control of the operating unit 20 can be performed separately from (independent of) the power supply control of the main body 10.

System Configuration

Figure 3:
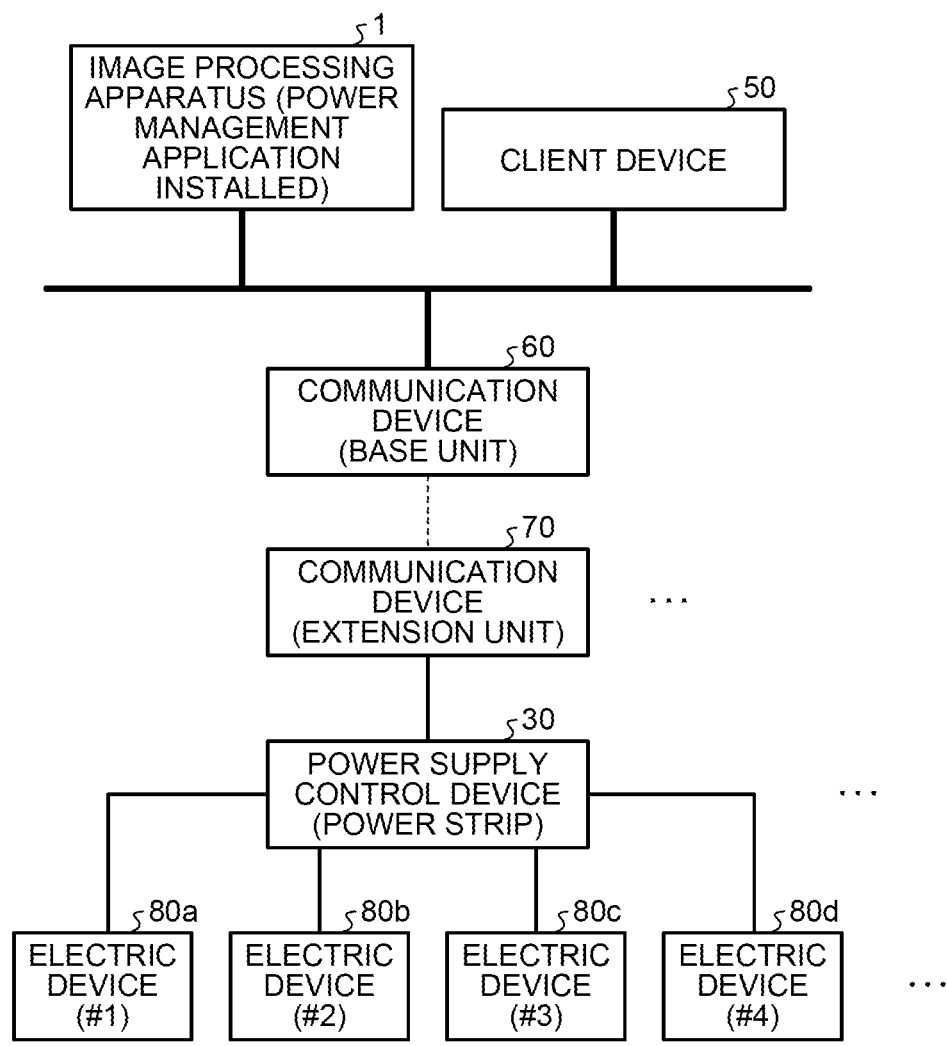
FIG. 3 is a block diagram illustrating an example of the system configuration of the power management system.

Next, with reference to FIG. 3, the system configuration of the power management system 100 will be described. FIG. 3 is a block diagram illustrating an example of the system configuration of the power management system 100.

As illustrated in FIG. 3, the power management system 100 includes the image processing apparatus 1, a power supply control device 30, a client device 50, a communication device 60, a communication device 70, and electric devices 80a to 80d.

The network 40 among the image processing apparatus 1, the client device 50, and the communication device 60 out of the foregoing is implemented by a network such as a LAN. The network 40 between the communication device 60 and the communication device 70 may be a wireless communication or may be a wired communication. Furthermore, the communication device 60 is a base unit and is connected to a plurality of communication devices 70 that are extension units. When the communication devices 70 are arranged at predetermined positions, the number of power supply control devices 30 and that of the electric devices 80a to 80d change in response to the number of extension units arranged.

The image processing apparatus 1 is an MFP that is installed with a power management application, and by executing the power management application, controls the power supply of the various electric devices via the power supply control device 30. The client device 50 is a personal computer (PC), for example, and controls the power supply of the various electric devices using a browser. While the details will be described later, there are situations of the control of power supply of the various electric devices by the client device 50 being performed through the image processing apparatus 1 and that being performed without going through the image processing apparatus 1.

The communication device 60 and the communication device 70 are devices to implement the communication between the image processing apparatus 1 and the power supply control device 30 and the communication between the client device 50 and the power supply control device 30. While the number of communication devices 70 that are extension units changes in response to the number of electric devices to manage the power thereof, the communication device 70 may not need to be provided when the number of electric devices is small. The power supply control device 30 is a power strip and performs the power supply control of the various electric devices. In other words, the power supply control device 30 that is a power strip has a plurality of outlets to supply power to a plurality of electric devices, and the outlets can be connected with the electric devices. The electric devices 80a to 80d are the devices that receive the supply of power. The number of the electric devices is optional.

Functional Configuration in First Embodiment

Figure 4:
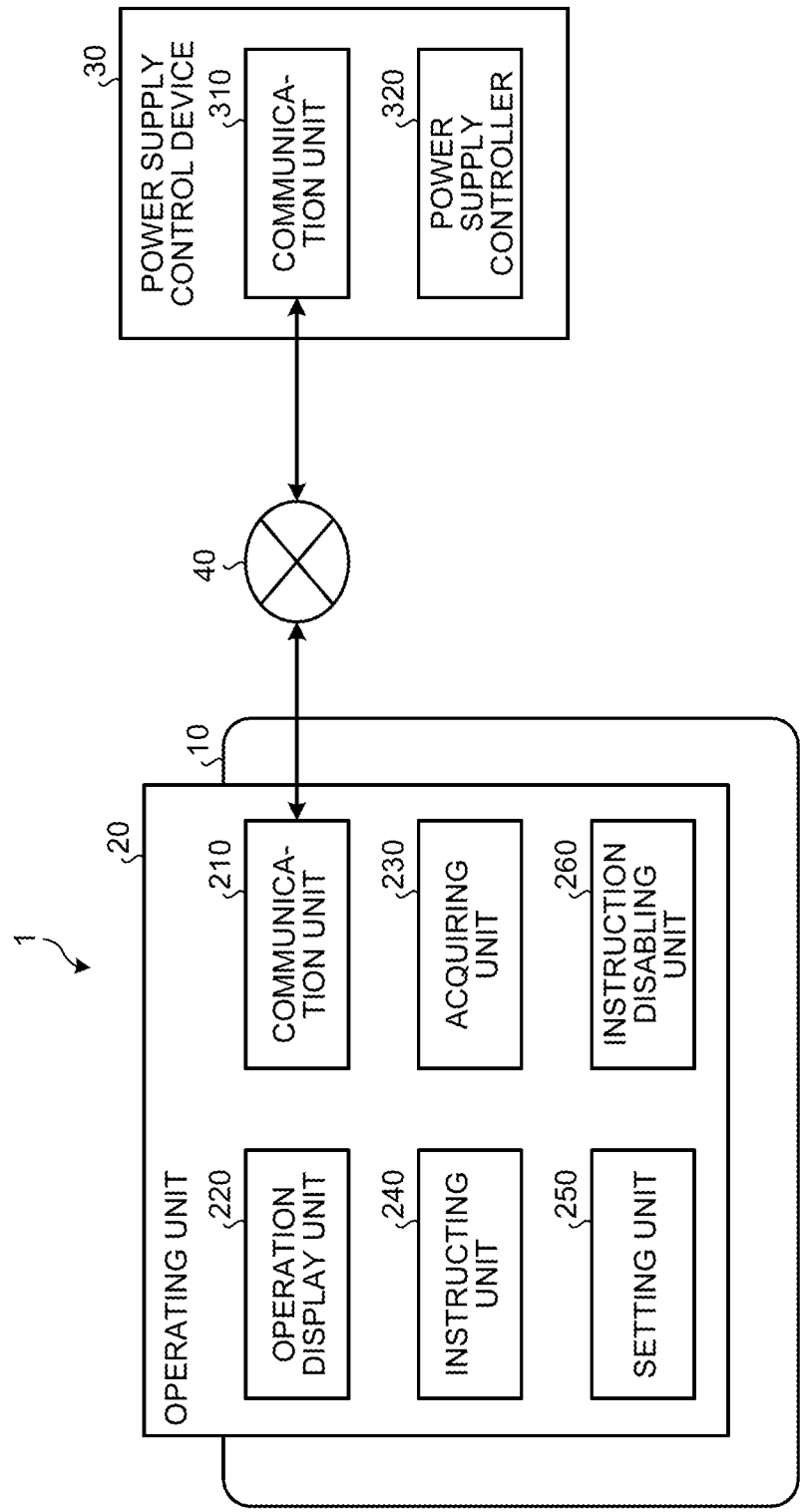
FIG. 4 is a block diagram illustrating an example of the functional configurations of an image processing apparatus and a power supply control device according to a first embodiment of the present invention.

Next, with reference to FIG. 4, the following describes the functions of the image processing apparatus 1 and the power supply control device 30. FIG. 4 is a block diagram illustrating an example of the functional configurations of the image processing apparatus 1 and the power supply control device 30 in the first embodiment. In the first embodiment, the control of power supply of the various electric devices by the client device 50 is assumed to be performed through the image processing apparatus 1.

As illustrated in FIG. 4, the operating unit 20 includes a communication unit 210, an operation display unit 220, an acquiring unit 230, an instructing unit 240, a setting unit 250, and an instruction disabling unit 260. As for the various units in the foregoing, a part or the whole thereof may be software (programs) or hardware circuits.

The communication unit 210 performs communication with the power supply control device 30 connected to the network 40. More specifically, the communication unit 210 performs communication with the power supply control device 30, and transmits and receives information to control the power supply of the various electric devices, a power supplying state, information of power consumption of the various electric devices, and others.

The operation display unit 220 displays various types of information and receives input of user operation. More specifically, the operation display unit 220 displays an image for controlling the power supply of the various electric devices, an image including the power consumption of the various electric devices, and others. The operation display unit 220 further receives the input of a user operation concerning the supply or shutoff of the power supply of an electric device, a user operation to specify power supply to be not permitted to shut off, a user operation to acquire power consumption, and others.

The acquiring unit 230 acquires information of the power consumption of the electric devices via the communication unit 210. More specifically, the acquiring unit 230 acquires, via the communication unit 210, the power consumption of the various electric devices from the power supply control device 30. The acquiring unit 230 further acquires a power supplying state of the power supply control device 30. The acquisition of the power consumption may be performed regularly or may be performed when a user operation to acquire the power consumption is made on the operation display unit 220. The power consumption acquired is stored in a memory and used as the information to display on the operation display unit 220.

FIG. 5 is a diagram illustrating an example of a display screen for an instant power consumption status. As illustrated in FIG. 5, each power supply control device is defined with identification information such as power strip #1 and power strip #2. Furthermore, the outlets of each power supply control device are defined with identification information such as outlet #1 and outlet #2. In such a display screen, the power consumption of the electric devices corresponding to the identification information of the power strip and the identification information of the outlet are displayed. As an example, the power consumption of the electric device connected to the outlet #1 of the power strip #1 is 100 watts, and that of the electric device connected to the outlet #2 of the power strip #1 is 50 watts. Furthermore, as for the outlet #3 and the outlet #5 of the power strip #1, because either the power supply is shut off or an electric device is not connected, the power consumption is 0 watts. Moreover, an update button is arranged on the display screen. The update button is a button to depress to update the display to the latest power consumption status. When the update button is depressed by user operation, the power consumption of the various electric devices are acquired by the acquiring unit 230 and the power consumption acquired are then displayed.

The instructing unit 240 instructs the power supply control device 30 via the communication unit 210 to supply or shut off power supply. More specifically, when the operation display unit 220 receives a user operation concerning the supply or shutoff of power supply, the instructing unit 240 instructs the power supply control device 30 via the communication unit 210 to supply or shut off the power supply specified.

FIG. 6 is a diagram illustrating an example of a display screen to specify power supply to be supplied or shut off. As illustrated in FIG. 6, in such a display screen, the power supplying states of the electric devices corresponding to the identification information of the power strip and the identification information of the outlet are displayed. As an example, the outlet #1 of the power strip #1 is powered up (on), and the outlet #3 of the power strip #1 is shut off (off). Furthermore, an update button is arranged on the display screen. The update button is a button to depress to update the display to the latest power supplying state. When the update button is depressed by user operation, the power supplying state of each of the various electric devices is acquired by the acquiring unit 230, and the power supplying states acquired are then displayed.

Moreover, on the display screen illustrated in FIG. 6, the power supply of the various electric devices can be controlled. For example, when an image displayed as being powered up (on) is depressed by user operation, a shutoff instruction of appropriate power supply by the instructing unit 240 is executed and the display screen is updated as being shut off (off). Meanwhile, when an image displayed as being shut off (off) is depressed by user operation, the supply instruction of appropriate power supply by the instructing unit 240 is executed, and the display screen is updated as being powered up (on).

The setting unit 250 sets power supply to be not permitted to shut off. More specifically, when the operation display unit 220 receives a user operation to specify the power supply to be not permitted to shut off, the setting unit 250 sets the specified power supply to be not permitted to shut off. The setting information concerning the permission or prohibition of the power supply to shut off is stored in the memory.

FIG. 7 is a diagram illustrating an example of a display screen to set power supply to be not permitted to shut off. As illustrated in FIG. 7, on such a display screen, a power supplying state of the electric device and the information of the power supply not permitted to shut off are displayed corresponding to the identification information of the power strip and the identification information of the outlet. As an example, the outlet #1 of the power strip #1 is powered up (on) and shutting off the power supply is not permitted. In other words, the power supply of the electric device connected to the outlet #1 of the power strip #1 is prohibited to shut off. When the user wants to prohibit shutting off the power supply, the user performs a long-depress on an appropriate button or selects an item that prohibits the shutoff from a menu displayed after the appropriate button is depressed, for example. Consequently, the operation display unit 220 receives it as the user operation to specify the power supply to be not permitted to shut off, and the setting unit 250 stores the information of setting the specified power supply to be not permitted to shut off in the memory. For the buttons other than those set as the power supply being not permitted to shut off, the power supply can be controlled as described with reference to FIG. 6. The update button is of the same use as that described with reference to FIG. 6.

The instruction disabling unit 260 disables a shutoff instruction of the power supply set to be not permitted to shut off. More specifically, when the power supply set to be not permitted to shut off by the setting unit 250 is the target of the shutoff instruction by the instructing unit 240, the instruction disabling unit 260 disables the shutoff instruction of the power supply by the instructing unit 240. As an example, when a user operation to shut off the power supply of the outlet #1 of the power strip #1 is performed on the display screen illustrated in FIG. 7, the instruction disabling unit 260 disables the shutoff instruction of the power supply by the instructing unit 240. In other words, when the user operation to shut off the power supply is performed, the instructing unit 240 attempts to perform the shutoff instruction of the power supply, but the shutoff instruction of the power supply is disabled by the instruction disabling unit 260. At this time, the operation display unit 220 may display a massage saying that shutting off the power supply is prohibited on the display screen.

The power supply control device 30 includes a communication unit 310 and a power supply controller 320. The communication unit 310 performs communication with the image processing apparatus 1 connected to the network 40. More specifically, the communication unit 310 performs communication with the image processing apparatus 1, and transmits and receives the information of the power consumption of various electric devices, a power supplying state, the information to control the power supply of the various electric devices, and others. As in the foregoing, the information of the power consumption of various electric devices and the power supplying state are transmitted regularly or transmitted in response to a request. The power supply controller 320 controls the supply or shutoff of the power supply of an electric device. More specifically, when the power supply controller 320 receives an instruction concerning the supply or shutoff of the power supply of an electric device from the image processing apparatus 1 via the communication unit 310, the power supply controller 320 controls the supply or shutoff of the power supply of the appropriate outlet of the appropriate power strip.

Power Management Process Sequence in First Embodiment

Figure 8:
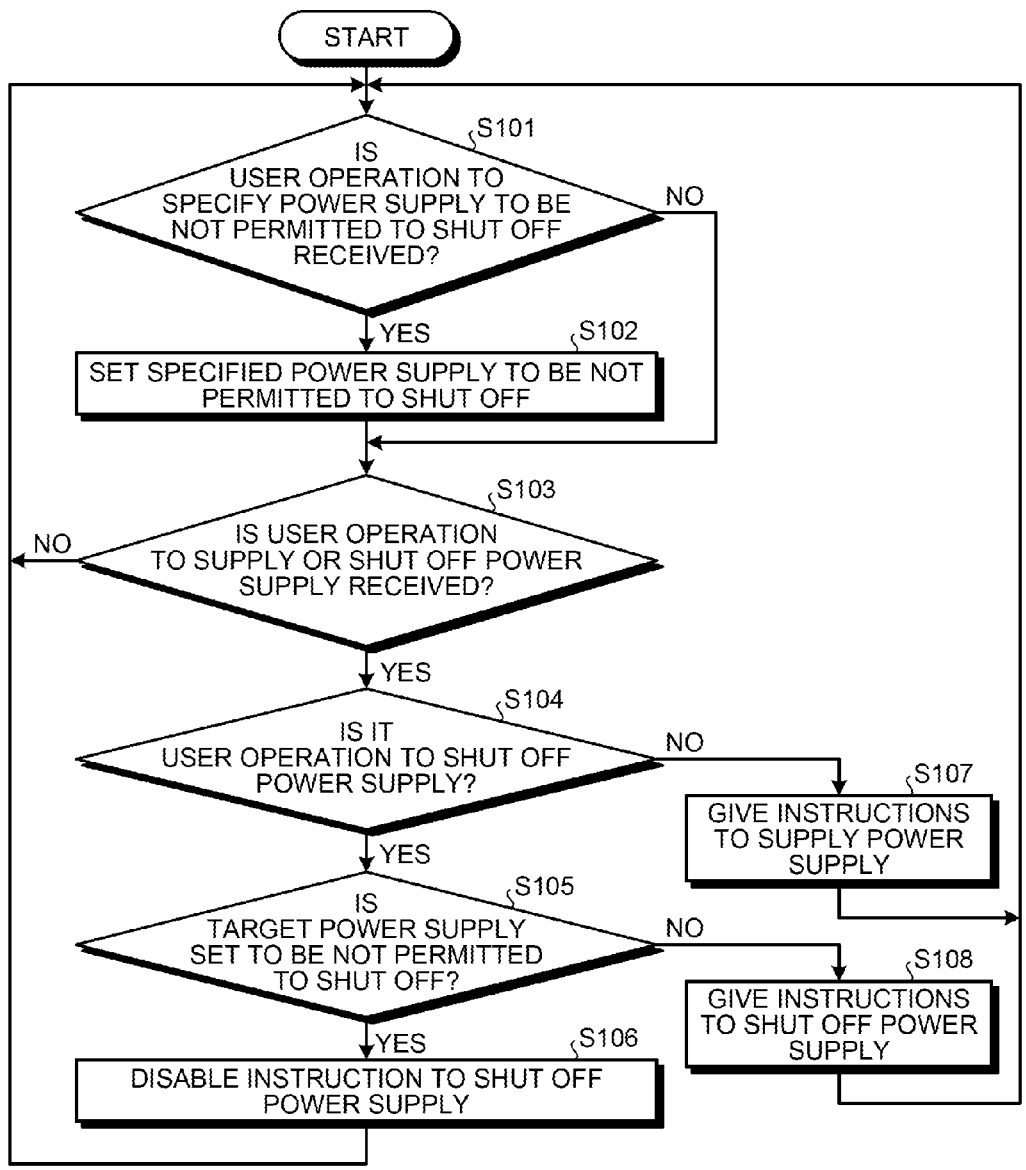
FIG. 8 is a flowchart illustrating an example of a sequence of a power management process performed in the first embodiment.

Next, with reference to FIG. 8, the following describes the sequence of a power management process performed in the first embodiment. FIG. 8 is a flowchart illustrating an example of the sequence of the power management process performed in the first embodiment.

As illustrated in FIG. 8, the operation display unit 220 determines whether a user operation to specify power supply to be not permitted to shut off is received (Step S101). If the operation display unit 220 receives the user operation (Yes at Step S101), the setting unit 250 sets the specified power supply to be not permitted to shut off (Step S102). Meanwhile, if the operation display unit 220 receives no user operation to specify power supply to be not permitted to shut off (No at Step S101), the operation display unit 220 executes the process at Step S103.

The operation display unit 220 then determines whether a user operation to supply or shut off power supply is received (Step S103). If the user operation to supply or shut off the power supply is received (Yes at Step S103), the operation display unit 220 determines whether the user operation is to shut off the power supply (Step S104). Meanwhile, if a user operation to supply or shut off power supply is not received by the operation display unit 220 (No at Step S103), the process at Step S101 is executed again.

If a user operation to shut off the power supply is received by the operation display unit 220 (Yes at Step S104), the instruction disabling unit 260 determines whether the power supply set by the setting unit 250 to be not permitted to shut off is the target of shutoff (Step S105). If the power supply set to be not permitted to shut off is the target of shutoff (Yes at Step S105), the instruction disabling unit 260 disables the shutoff instruction of the power supply by the instructing unit 240 (Step S106).

If the operation display unit 220 receives a user operation to supply the power supply (No at Step S104), the instructing unit 240 instructs the power supply control device 30 via the communication unit 210 to supply the power supply (Step S107). If the instruction disabling unit 260 determines that the power supply set to be permitted to shut off is the target of shutoff (No at Step S105), the instructing unit 240 instructs the power supply control device 30 via the communication unit 210 to shut off the power supply (Step S108).

According to the first embodiment, the image processing apparatus 1 sets power supply to be not permitted to shut off in response to a user operation, and upon receiving a user operation to shut off the power supply, disables the shutoff instruction of the power supply corresponding to the user operation to shut off the power supply when the target power supply is set to be not permitted to shut off. As a consequence, the image processing apparatus 1 can prevent erroneously shutting off the power supply of a device that is undesirable to cut the supply of power.

Second Embodiment

In the first embodiment, exemplified has been the situation of setting appropriate power supply to be not permitted to shut off based on the user operation to set the power supply to be not permitted to shut off. In a second embodiment, exemplified will be a situation of changing the setting concerning the shutoff of power supply based on the power consumption of each power supply.

Functional Configuration in Second Embodiment

Figure 9:
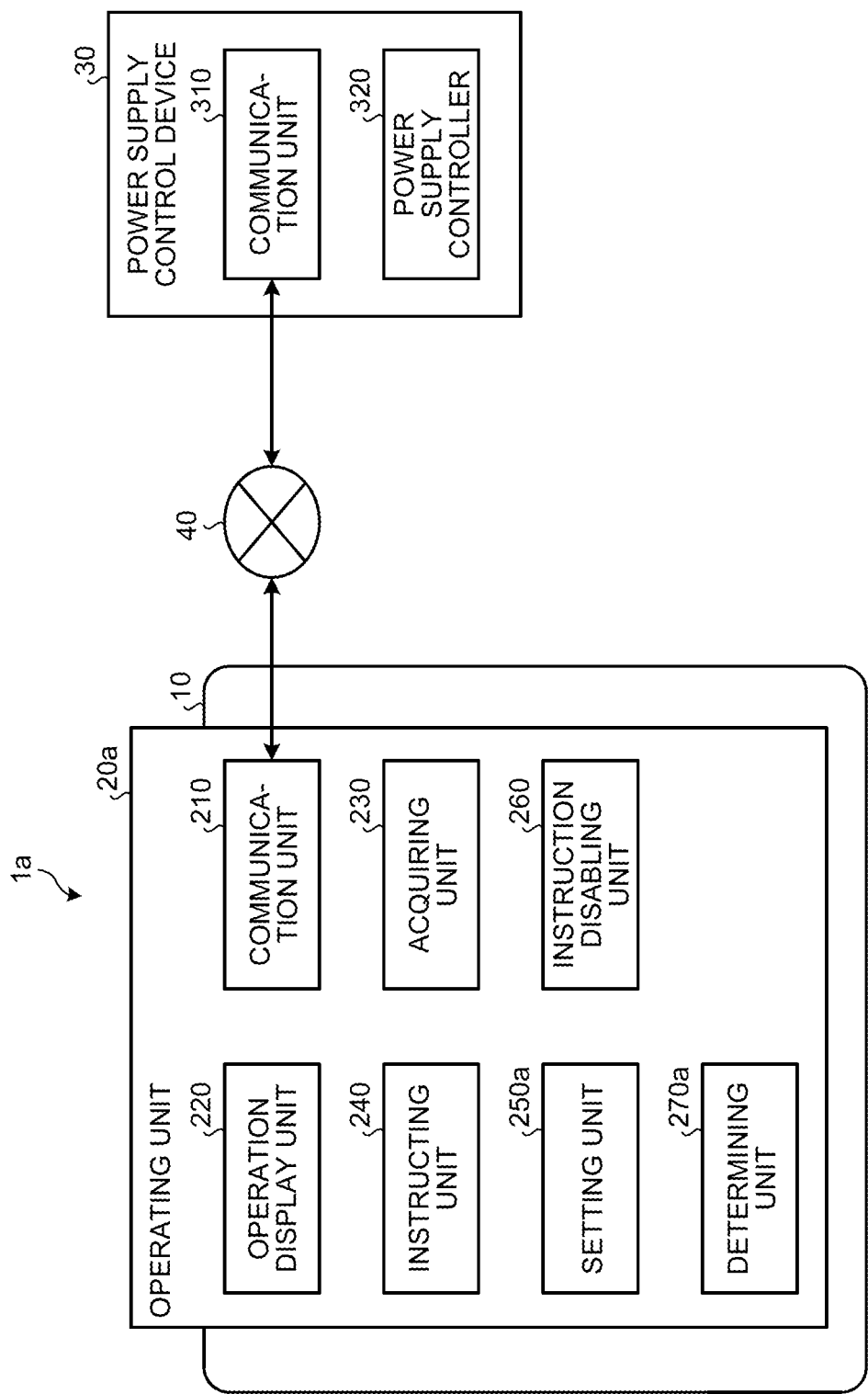
FIG. 9 is a block diagram illustrating an example of the functional configurations of an image processing apparatus and a power supply control device according to a second embodiment of the present invention.

With reference to FIG. 9, the following describes the functions of an image processing apparatus and a power supply control device in the second embodiment. FIG. 9 is a block diagram illustrating an example of the functional configurations of an image processing apparatus and a power supply control device in the second embodiment. In the second embodiment, the constituents the same as or similar to those in the first embodiment will bear the same reference numerals or symbols, and the explanations thereof in detail may be omitted. Specifically, the functions, configurations, and processes, except for those of a setting unit 250a and a determining unit 270a in the following description, are the same as those in the first embodiment.

As illustrated in FIG. 9, an operating unit 20a of an image processing apparatus 1a includes the communication unit 210, the operation display unit 220, the acquiring unit 230, the instructing unit 240, the setting unit 250a, the instruction disabling unit 260, and the determining unit 270a.

The determining unit 270a determines whether the power consumption of an electric device satisfies a given condition. More specifically, the determining unit 270a determines whether the fluctuations in power consumption are equal to or greater than a given power consumption value in a given period of time, based on the transition of power consumption of an electric device connected to each power supply acquired by the acquiring unit 230. The given period of time is defined as one day, for example. The given power consumption value is defined as 50 watts, for example. More specifically, the determining unit 270a determines whether the fluctuations in power consumption are equal to or greater than 50 watts based on the transition of power consumption for one day.

Figure 10:
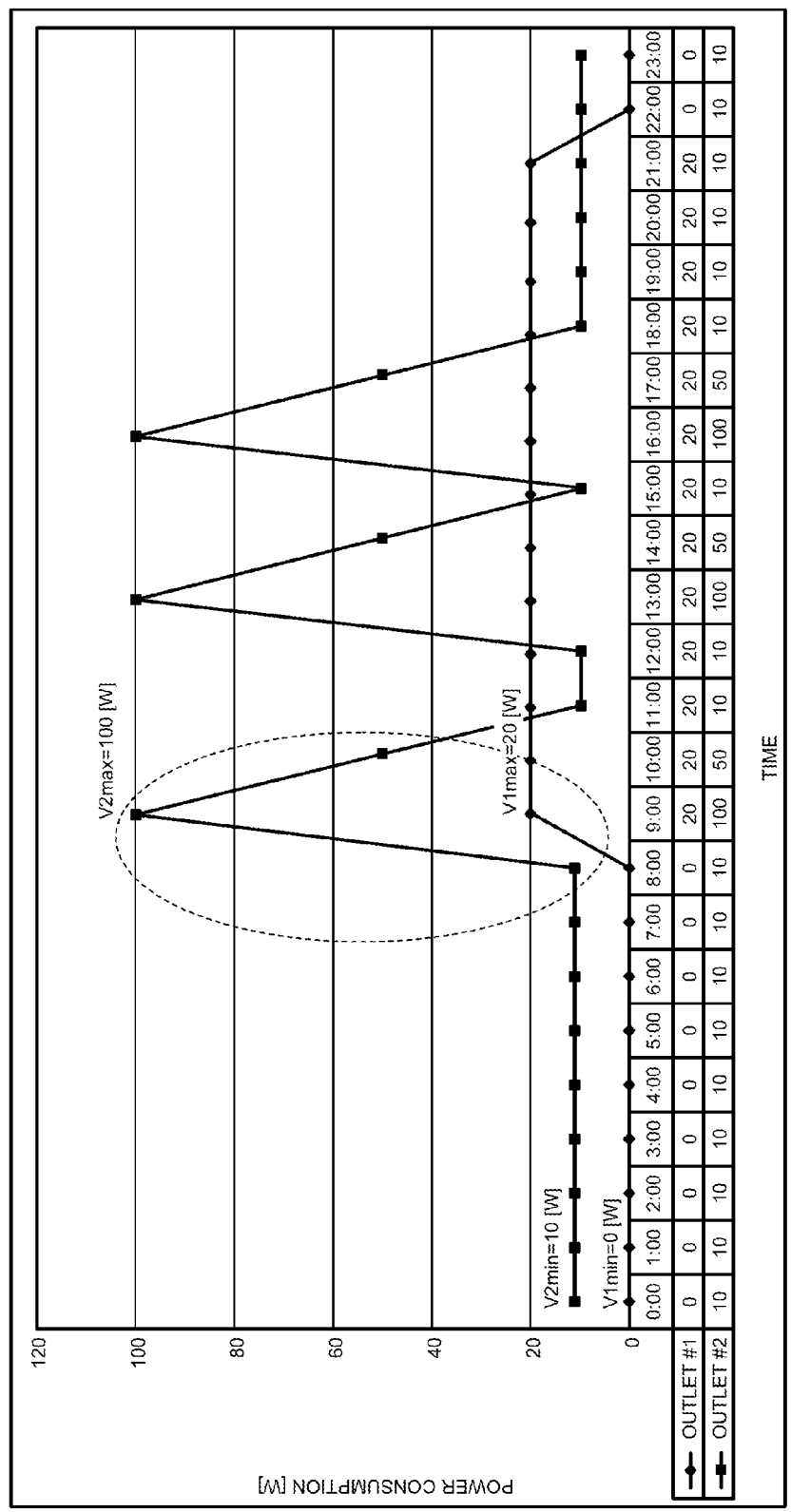
FIG. 10 is a chart illustrating an example of the transition of power consumption for one day.

FIG. 10 is a chart illustrating an example of the transition of power consumption for one day. In FIG. 10, the transition of power consumption for one day from 0:00 to 23:00 is represented. To the outlet #1, connected is a florescent light that is mainly used from 9:00 to 21:00. To the outlet #2, connected is an MFP that is used at necessary timing. As illustrated in FIG. 10, the determining unit 270a analyzes the transition of power consumption of the outlet #1, and determines whether 20 watts at 9:00 (changed from 0 watts to 20 watts) for which the fluctuations in power consumption is maximum is equal to or greater than 50 watts. In the same manner, the determining unit 270a analyzes the transition of power consumption of the outlet #2, and determines whether 90 watts at 9:00 (changed from 10 watts to 100 watts) for which the fluctuations in power consumption is maximum is equal to or greater than 50 watts. Based on these, the determining unit 270a outputs the determination result of being under the given power consumption value for the outlet #1, and outputs the determination result of being over the given power consumption value for the outlet #2.

The setting unit 250a changes the setting concerning the shutoff of an appropriate electric device in response to the determination result output by the determining unit 270a. More specifically, the setting unit 250a receives the determination result, which is output by the determining unit 270a, of whether the power consumption of each outlet is equal to or greater than the given power consumption value. The setting unit 250a then sets the power supply of the outlet, for which the power consumption is equal to or greater than the given power consumption value, to be not permitted to shut off. The setting unit 250a further sets the power supply of the outlet, for which the power consumption is below the given power consumption value, to be permitted to shut off. The display screen is updated in response to the setting by the setting unit 250a.

Power Management Process Sequence in Second Embodiment

Figure 11:
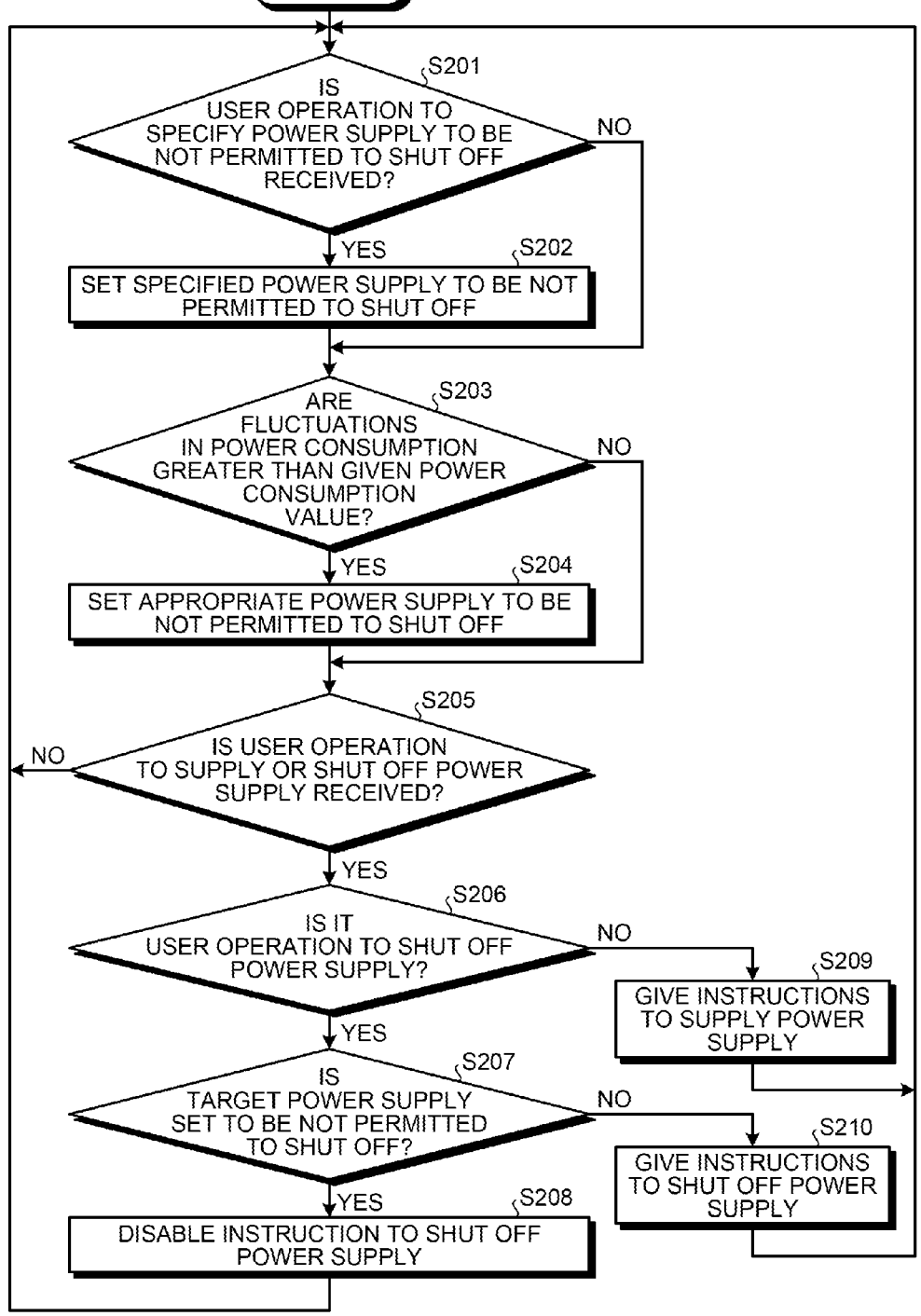
FIG. 11 is a flowchart illustrating an example of a sequence of a power management process performed in the second embodiment.

Next, with reference to FIG. 11, the following describes the sequence of a power management process performed in the second embodiment. FIG. 11 is a flowchart illustrating an example of the sequence of the power management process performed in the second embodiment. The explanations are omitted for the same steps as those in the sequence of the power management process in the first embodiment. Specifically, the processes performed at Step S201 and Step S202 are the same as those performed at Step S101 and Step S102. Furthermore, the processes performed at steps from Step 3205 to Step S210 are the same as those performed at steps from Step S103 to Step S108.

As illustrated in FIG. 11, the determining unit 270a determines whether the fluctuations in power consumption of an electric device connected to each power supply acquired by the acquiring unit 230 are equal to or greater than the given power consumption value (Step S203). If the determining unit 270a determines that they are equal to or greater than the given power consumption value (Yes at Step S203), the setting unit 250a sets appropriate power supply to be not permitted to shut off (Step S204). Meanwhile, if the determining unit 270a determines that they are below the given power consumption value (No at Step S203), the setting unit 250a sets appropriate power supply to be permitted to shut off. Subsequent to this, the process at Step S205 is performed.

According to the second embodiment, the image processing apparatus 1a, when the fluctuations in power consumption of an electric device connected to power supply are equal to or greater than the given power consumption value in a given period of time, sets appropriate power supply to be not permitted to shut off. As a consequence, the image processing apparatus 1a sets the power supply of an electric device that temporarily requires much power not to shut off, and thus can prevent erroneously shutting off the power supply of a device that is undesirable to cut the supply of power.

Third Embodiment

In the second embodiment, exemplified has been the situation of changing the setting concerning the shutoff of power supply when there is a time present in which a given power consumption value is exceeded in the transition of power consumption for one day. In a third embodiment, exemplified will be a situation of changing the setting concerning the shutoff of power supply in response to whether there are any fluctuations present in power consumption in a given period of time.

Functional Configuration in Third Embodiment

Figure 12:
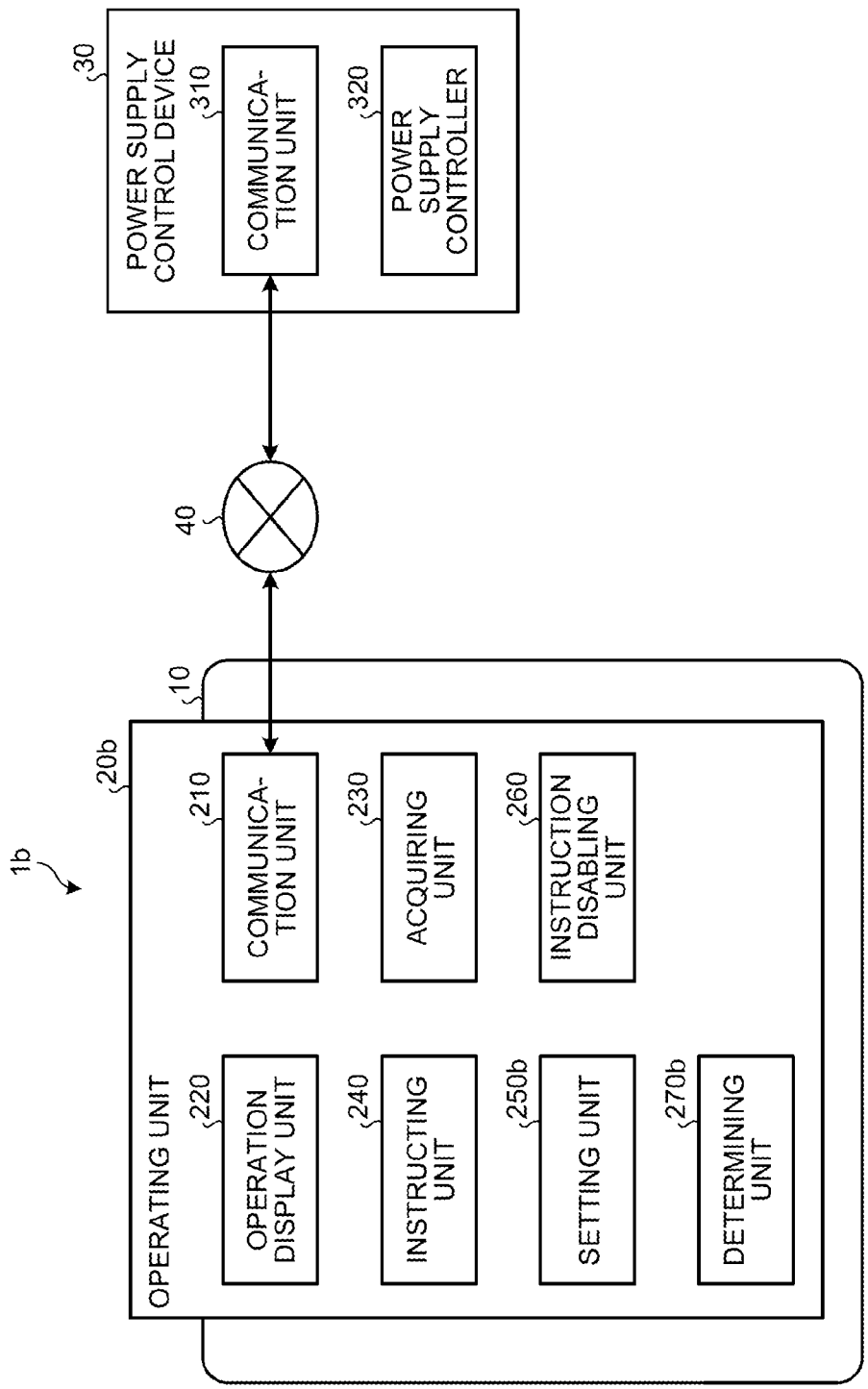
FIG. 12 is a block diagram illustrating an example of the functional configurations of an image processing apparatus and a power supply control device according to a third embodiment of the present invention.

With reference to FIG. 12, the following describes the functions of an image processing apparatus and a power supply control device in the third embodiment. FIG. 12 is a block diagram illustrating the functional configurations of an image processing apparatus and a power supply control device in the third embodiment. In the third embodiment, the constituents the same as or similar to those in the first embodiment will bear the same reference numerals or symbols, and the explanations thereof in detail may be omitted. Specifically, the functions, configurations, and processes, except for those of a setting unit 250b and a determining unit 270b in the following description, are the same as those in the first embodiment.

As illustrated in FIG. 12, an operating unit 20b of an image processing apparatus 1b includes the communication unit 210, the operation display unit 220, the acquiring unit 230, the instructing unit 240, the setting unit 250b, the instruction disabling unit 260, and the determining unit 270b. The third embodiment describes a situation of the setting concerning the shutoff of power supply being set to be not permitted.

The determining unit 270b determines whether the power consumption of an electric device satisfies a given condition. More specifically, the determining unit 270b determines whether there are any fluctuations present in power consumption in a given period of time, based on the transition of power consumption of an electric device connected to each power supply acquired by the acquiring unit 230. The given period of time is defined as three days, for example. More specifically, the determining unit 270b determines whether there are any fluctuations present in power consumption based on the transition of power consumption for three days. The determining unit 270b then outputs the determination result of the fluctuations in power consumption being present or the determination result of the fluctuations in power consumption being not present.

The setting unit 250b changes the setting concerning the shutoff of an appropriate electric device in response to the determination result output by the determining unit 270b. More specifically, the setting unit 250b receives the determination result, which is output by the determining unit 270b, of whether there are any fluctuations present in power consumption of each outlet. The setting unit 250b then sets the power supply of the outlets, for which no fluctuations are present in power consumption, to be permitted to shut off. Meanwhile, the setting unit 250b does not change the setting concerning the shutoff of the power supply of the outlets for which fluctuations are present in power consumption. The display screen is updated in response to the setting by the setting unit 250b.

Power Management Process Sequence in Third Embodiment

Figure 13:
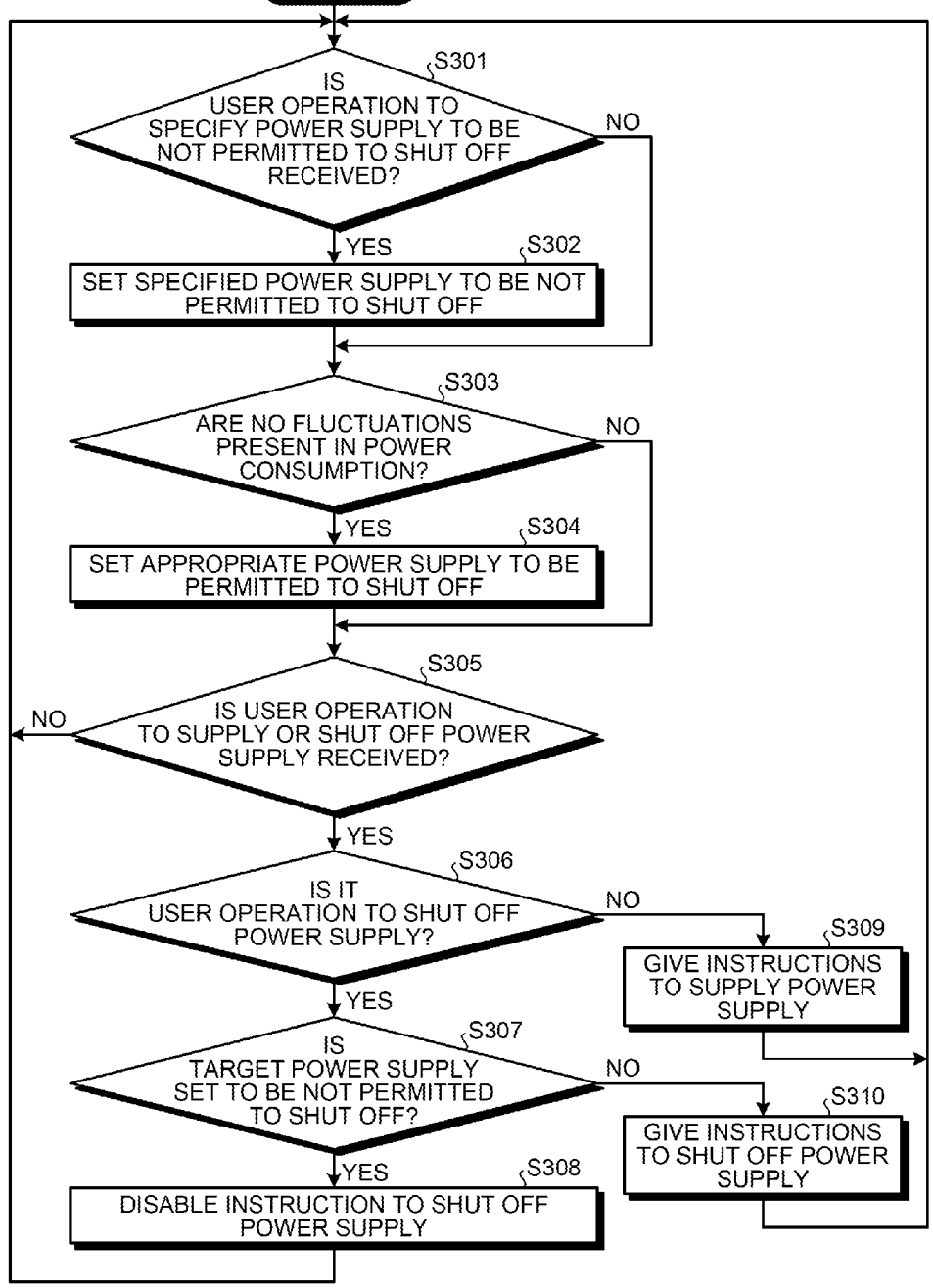
FIG. 13 is a flowchart illustrating an example of a sequence of a power management process performed in the third embodiment.

Next, with reference to FIG. 13, the following describes the sequence of a power management process performed in the third embodiment. FIG. 13 is a flowchart illustrating an example of the sequence of the power management process performed in the third embodiment. The explanations are omitted for the same steps as those in the sequence of the power management process in the first embodiment. Specifically, the processes performed at Step S301 and Step S302 are the same as those performed at Step S101 and Step S102. Furthermore, the processes performed at steps from Step 3305 to Step S310 are the same as those performed at steps from Step S103 to Step S108.

As illustrated in FIG. 13, the determining unit 270b determines whether no fluctuations are present in the power consumption of an electric device connected to each power supply acquired by the acquiring unit 230 (Step S303). If the determining unit 270b determines that no fluctuations are present in power consumption (Yes at Step S303), the setting unit 250b sets appropriate power supply to be permitted to shut off (Step S304). Meanwhile, if the determining unit 270b determines that fluctuations are present in power consumption (No at Step S303), the process at Step S305 is performed.

According to the third embodiment, the image processing apparatus 1b, when no fluctuations in power consumption of an electric device connected to the power supply are present in a given period of time, sets the appropriate power supply to be permitted to shut off. As a consequence, the image processing apparatus 1b sets the power supply connected with an electric device not requiring the power to be permitted to shut off, and thus can achieve power-saving and prevent erroneously shutting off the power supply of a device that is undesirable to cut the supply of power.

Fourth Embodiment

In the first to the third embodiments, exemplified have been the situations of the control of the power supply of various electric devices by the client device 50 being performed through the image processing apparatus. In a fourth embodiment, exemplified will be the power management in which the control of the power supply of various electric devices by the client device 50 is performed without going through the image processing apparatus.

Functional Configuration in Fourth Embodiment

Figure 14:
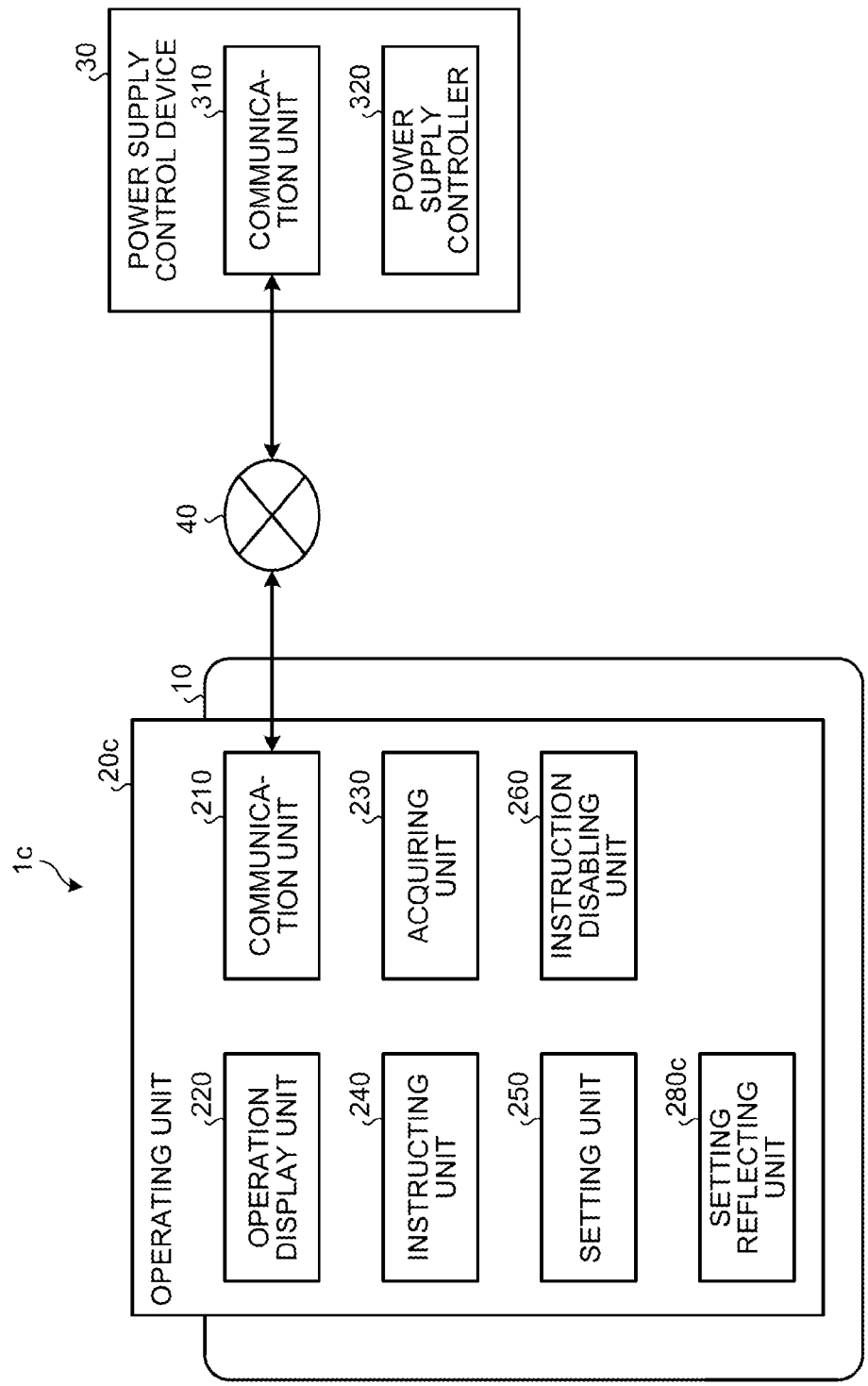
FIG. 14 is a block diagram illustrating an example of the functional configurations of an image processing apparatus and a power supply control device according to a fourth embodiment of the present invention.

With reference to FIG. 14, the following describes the functions of an image processing apparatus and a power supply control device in the fourth embodiment. FIG. 14 is a block diagram illustrating the functional configurations of the image processing apparatus and the power supply control device in the fourth embodiment. In the fourth embodiment, the constituents the same as or similar to those in the first embodiment will bear the same reference numerals or symbols, and the explanations thereof in detail may be omitted. Specifically, the functions, configurations, and processes, except for those of a setting reflecting unit 280c in the following description, are the same as those in the first embodiment.

As illustrated in FIG. 14, an operating unit 20c of an image processing apparatus 1c includes the communication unit 210, the operation display unit 220, the acquiring unit 230, the instructing unit 240, the setting unit 250, the instruction disabling unit 260, and the setting reflecting unit 280c.

The setting reflecting unit 280c instructs the power supply control device 30 via the communication unit 210 to reflect the setting concerning the shutoff of power supply. More specifically, the setting reflecting unit 280c acquires the setting concerning the shutoff of power supply set by the setting unit 250 from the memory. The setting reflecting unit 280c, via the communication unit 210, then specifies the setting acquired to the power supply control device 30 to reflect the specified setting concerning the shutoff of the target power supply. Consequently, the power supply control device 30 reflects the setting in each power supply.

Power Management Process Sequence in Fourth Embodiment

Figure 15:
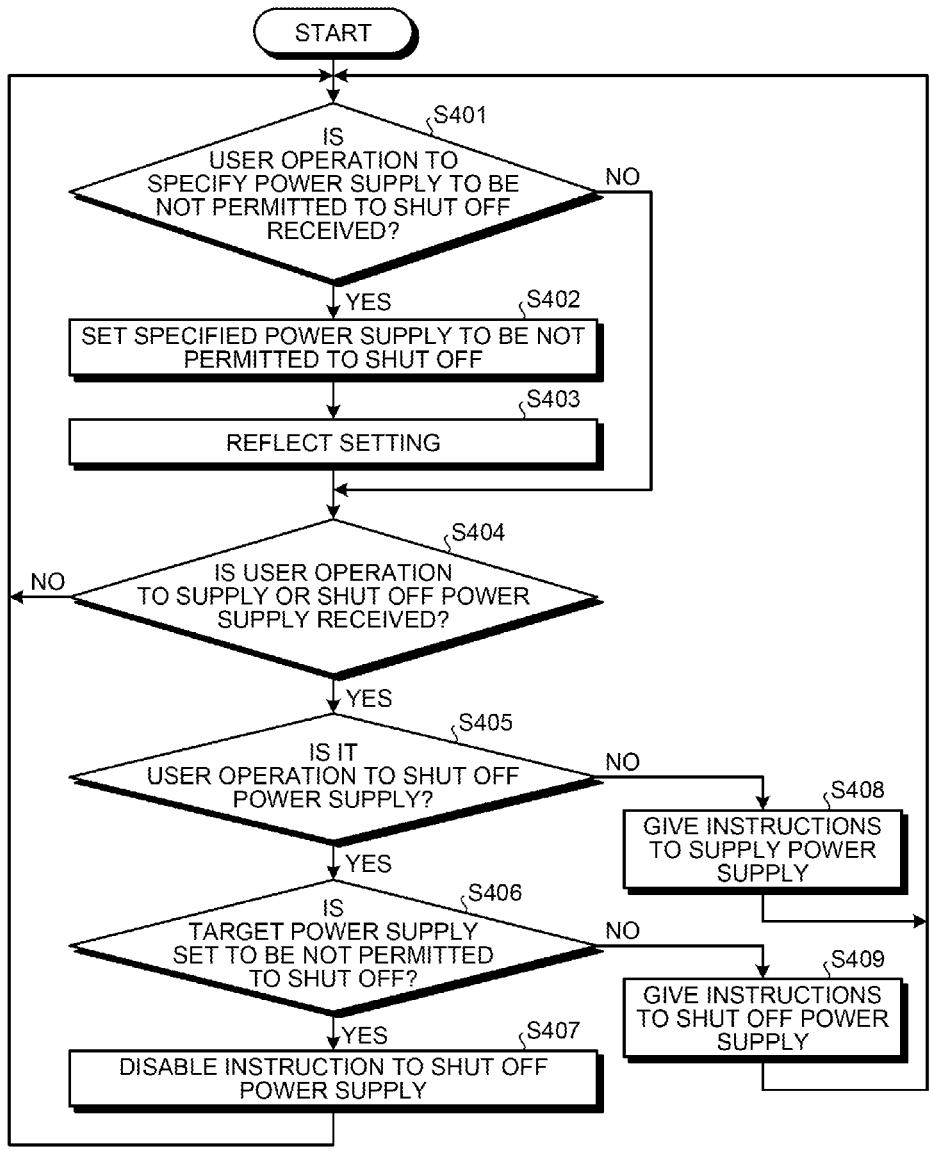
FIG. 15 is a flowchart illustrating an example of a sequence of a power management process performed in the fourth embodiment.

Next, with reference to FIG. 15, the following describes the sequence of a power management process performed in the fourth embodiment. FIG. 15 is a flowchart illustrating an example of the sequence of the power management process performed in the fourth embodiment. The explanations are omitted for the same steps as those in the sequence of the power management process in the first embodiment. Specifically, the processes performed at Step S401 and Step S402 are the same as those performed at Step S101 and Step S102. Furthermore, the processes performed at steps from Step S404 to Step S409 are the same as those performed at steps from Step S103 to Step S108.

As illustrated in FIG. 15, the setting reflecting unit 280c acquires the setting concerning the shutoff of power supply set by the setting unit 250, and via the communication unit 210, specifies the setting acquired to the power supply control device 30 to reflect the specified setting concerning the shutoff of the target power supply (Step S403).

According to the fourth embodiment, the image processing apparatus 1c sets the setting concerning the shutoff of power supply on the power supply, and thus even when the control of power supply by a device different from the image processing apparatus 1c itself is permitted, can prevent erroneously shutting off the power supply of a device that is undesirable to cut the supply of power.

Fifth Embodiment

While the embodiments of the image processing apparatus 1, the image processing apparatus 1a, the image processing apparatus 1b, and the image processing apparatus 1c according to the present invention have been described above, the invention may be implemented in various different embodiments other than the above-described embodiments. Thus, different embodiments in (1) configurations and (2) programs will be described.

(1) Configuration

The processing procedures, control procedures, specific names, and information including various types of data and parameters described above and illustrated in the drawings can be optionally changed, except when specified otherwise. The constituent elements of the apparatuses and devices illustrated are functionally conceptual and are not necessarily configured physically as illustrated in the drawings. In other words, the specific embodiments of distribution or integration of apparatuses and devices are not restricted to those illustrated, and the whole or a part thereof can be configured by being functionally or physically distributed or integrated in any unit according to various types of loads and usage. For example, the given period of time in the second and the third embodiments are not limited to the above-described examples.

(2) Computer Program

The power management program executed by an information processing apparatus as the operating unit 20 is, as one aspect, recorded and provided in a computer readable recording medium such as a compact disc read-only memory (CD-ROM), a flexible disk (FD), a compact disc-recordable (CD-R), a digital versatile disk (DVD), as an installable or executable file. Furthermore, the power management program executed by the operating unit 20 may be stored in a computer connected to a network such as the Internet and provided being downloaded via the network. The power management program executed by the operating unit 20 may be provided or distributed via a network such as the Internet. The power management program may be embedded and provided in a ROM, for example.

The power management program executed by the operating unit 20 is modularly configured to include the above-described various units (the instructing unit 240, the setting unit 250, and the instruction disabling unit 260). As for the actual hardware, the CPU (processor) reads out the power management program from a storage medium and executes it to load each of the above-described various units on a main storage device, whereby the instructing unit 240, the setting unit 250, and the instruction disabling unit 260 are generated on the main storage device.

According to the present embodiments, it is possible to prevent erroneously shutting off the power supply of a device that is undesirable to cut the supply of power.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a main body and an operating unit;
   at least one processor in the operating unit, the at least one processor configured to,
   perform communication with a power supply controller controlling supply and shutoff of power supply of a device;
   receive input of a user operation, the user operation including at least one of a supply or shutoff of power supply of the device operation and at least one function including printing, copying, plotting, scanning, and faxing;
   instruct the power supply controller to supply or shut off power supply in response to the user operation concerning supply or shutoff of power supply of the device;
   set power supply specified to be not permitted to shut off in response to the user operation to specify the power supply to be not permitted to shut off;
   disable an instruction to shut off power supply when the power supply set to be not permitted to shut off is a target of the instruction to shut off power supply;
   receive a user operation for setting power for the device, communicate the user operation to the device,
   perform communication with the power supply controller without communicating via the main body; and
   transmit and receive a state of power of the device and information for power controlling the device.

2. The information processing apparatus according to claim 1, wherein the at least one processor is further configured to
   acquire power consumption of the device;
   determine whether a given condition is satisfied regarding the power consumption of the device; and
   change the setting concerning shutoff of the power supply corresponding to the device that satisfies the given condition when the power consumption of the device is determined to satisfy the given condition.

3. The information processing apparatus according to claim 2, wherein the processor is further configured to
   determine whether fluctuations in power consumption of the device in a given period of time are equal to or greater than a power consumption value, and
   set the power supply corresponding to the device to be not permitted to shut off when the fluctuations in power consumption of the device are determined to be equal to or greater than the power consumption value.

4. The information processing apparatus according to claim 2, wherein the at least one processor is further configured to
   determine whether fluctuations in power consumption of the device in a given period of time are below a power consumption value, and
   set the power supply corresponding to the device to be permitted to shut off when the fluctuations in power consumption of the device are determined to be below the power consumption value.

5. The information processing apparatus according to claim 2, wherein the at least one processor is further configured to
   determine whether there are any fluctuations present in power consumption of the device in a given period of time, and
   set the power supply corresponding to the device to be permitted to shut off when no fluctuations are determined to be present in power consumption of the device.

6. The information processing apparatus according to claim 1, wherein the at least one processor is further configured to
   permit supply and shutoff of power supply of the device to be specified from an external device different from the information processing apparatus, and
   specify a setting concerning shutoff of power supply to the power supply controller to reflect the specified setting concerning shutoff of the power supply.

7. The information processing apparatus according to claim 1, wherein the at least one processor is further configured to
   determine whether there are any fluctuations present in the power supply, and
   set the power supply corresponding to the device to not be permitted to shut off when fluctuations are determined to be present in the power supply.

8. A power management method performed by an operating unit of an information processing apparatus including a main body including a main body, the method comprising:
   instructing a power supply controller that controls supply and shutoff of power supply of a device to supply or shut off power supply in response to user operation at the operating unit concerning supply or shutoff of power supply of the device;
   executing at least one function including printing, copying, plotting, scanning, and faxing;

setting power supply specified to be not permitted to shut off in response to user operation to specify the power supply to be not permitted to shut off;

disabling an instruction to shut off power supply at the instructing when the power supply specified to be not permitted to shut off is a target of the instruction to shut off at the instructing;

performing communication with the power supply controller without communicating via the main body; and transmitting and receiving a state of power of the device and information for power controlling the device.

9. The power management method according to claim 8 further comprising:

acquiring power consumption of the device via the communication unit;

determining whether a given condition is satisfied regarding the power consumption of the device; and changing the setting concerning shutoff of the power supply corresponding to the device that satisfies the given condition when the power consumption of the device is determined to satisfy the given condition.

10. The power management method according to claim 9 further comprising:

determining whether fluctuations in power consumption of the device in a given period of time are equal to or greater than a power consumption value, and setting the power supply corresponding to the device to be not permitted to shut off when the fluctuations in power consumption of the device are determined to be equal to or greater than the power consumption value.

11. The power management method according to claim 9 further comprising:

determining whether fluctuations in power consumption of the device in a given period of time are below a power consumption value, and setting the power supply corresponding to the device to be permitted to shut off when the fluctuations in power consumption of the device are determined to be below the power consumption value.

12. The power management method according to claim 9 further comprising:

determining whether there are any fluctuations present in power consumption of the device in a given period of time, and setting the power supply corresponding to the device to be permitted to shut off when no fluctuations are determined to be present in power consumption of the device.

13. The power management method according to claim 9 further comprising:

permitting the supply and shutoff of power supply of the device to be specified from an external device different from the information processing apparatus, and specifying a setting concerning shutoff of power supply to the power supply controller to reflect the specified setting concerning shutoff of the power supply.

14. The power management method according to claim 8 further comprising:

determining whether there are any fluctuations present in the power supply, and setting the power supply corresponding to the device to not be permitted to shut off when fluctuations are determined to be present in the power supply.

* * * * *